US007519913B2

(12) United States Patent
Lection et al.

(10) Patent No.: US 7,519,913 B2
(45) Date of Patent: Apr. 14, 2009

(54) SYSTEM AND METHOD FOR PROVIDING INDICATORS OF COMPONENT INTERACTION CAPABILITY ACROSS NAVIGATION ELEMENTS

(75) Inventors: David Bruce Lection, Raleigh, NC (US); Eric Leonard Masselle, Raleigh, NC (US); Anuphinh Phimmasorn Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 11/421,670

(22) Filed: Jun. 1, 2006

(65) Prior Publication Data

US 2007/0283271 A1     Dec. 6, 2007

(51) Int. Cl.
*G06F 9/00*     (2006.01)
*G06F 3/00*     (2006.01)
(52) U.S. Cl. ..................................... 715/760; 715/761
(58) Field of Classification Search .................. None
See application file for complete search history.

(56) References Cited

U.S. PATENT DOCUMENTS

| 5,140,677 | A | 8/1992 | Fleming et al. ............. 395/159 |
| 6,055,515 | A | 4/2000 | Consentino et al. .......... 705/27 |
| 6,061,058 | A | 5/2000 | Owens et al. ............... 345/339 |
| 6,223,185 | B1 | 4/2001 | Berkland et al. ............ 707/103 |
| 6,272,488 | B1 | 8/2001 | Chang et al. .................... 707/4 |
| 6,668,353 | B1 | 12/2003 | Yurkovic .................. 715/501.1 |
| 6,807,668 | B2 | 10/2004 | Stern et al. ................... 719/329 |
| 2004/0243577 | A1 | 12/2004 | Choudhary et al. ............ 707/6 |
| 2006/0235935 | A1* | 10/2006 | Ng .............................. 709/208 |

FOREIGN PATENT DOCUMENTS

| WO | WO 03/012642 A2 | 2/2003 |
| WO | WO 2005/043388 A1 | 5/2005 |

* cited by examiner

*Primary Examiner*—William L Bashore
*Assistant Examiner*—Jordany Núñez
(74) *Attorney, Agent, or Firm*—VanLeeuwen & VanLeeuwen

(57) ABSTRACT

A system and method for providing indicators of component interaction capability across navigation elements is presented. A user selects an emitter portlet that is located on a viewable page. In turn, a property broker identifies compatible handler portlets located on different pages, and displays handler icons on navigation elements whose corresponding pages include compatible handler portlets. The user selects one of the handler icons and, as a result, the property manager links the emitter portlet to the handler portlet that corresponds to the handler icon, and displays the linked handler portlet's page. The property broker also performs similar functions to link a handler portlet to an emitter portlet.

3 Claims, 8 Drawing Sheets

SYSTEM AND METHOD FOR PROVIDING INDICATORS OF COMPONENT INTERACTION CAPABILITY ACROSS NAVIGATION ELEMENTS

BACKGROUND OF THE INVENTION

1. Technical Field

The present invention relates to a system and method for providing indicators of component interaction capability across navigation elements. More particularly, the present invention relates to a system and method for aiding a user in locating compatible handler portlets when an emitter portlet is known, as well as aiding a user in locating compatible emitter portlets when a handler portlet is known.

2. Description of the Related Art

A portal has traditionally been a Web-based application that includes "portlets," which are used as pluggable user interface components that provide a presentation layer to information systems. Portals have since evolved, and are now accepted as a critical mainstream development technology whose growth has outpaced most software technologies. Originally, portals were a means of aggregating content. Now, portals are used as a platform for developing integrated applications that are created from disparate backend applications and/or separate elements of large, complex, backend applications.

Using a technology that allows portlets to exchange data, such as IBM's Property Broker, a portal's portlets may generate (emit) data values with a particular property type, and may also receive (handle) data values with a particular property. During development, a user matches an emitter portlet with a compatible handler portlet that is able to process the emitter portlet's output property type.

During runtime, a user typically views portlets on a page-by-page basis, whereby each page represents a particular interface. When matching emitter portlets with handler portlets (and visa versa), compatible portlets may be located on different pages. A challenge found is that the user is not aware of all of the compatible portlets because the user views one particular page, and is not notified as to whether other compatible portlets are located on different pages.

What is needed, therefore, is a system and method for providing a user with indicators of portlet compatibility across pages.

SUMMARY

It has been discovered that the aforementioned challenges are resolved using a system and method for aiding a user in locating and navigating to handler portlets when an emitter portlet is known, as well as aiding a user in locating and navigating to emitter portlets when a handler portlet is known. A user selects an emitter portlet that is located on a viewable page. In turn, a property broker identifies compatible handler portlets located on different pages, and displays handler icons on navigation elements corresponding to the different pages that include compatible handler portlets. The user selects one of the handler icons and, as a result, the property manager links the emitter portlet to the handler portlet that corresponds to the handler icon, and displays the linked handler portlet's corresponding page. The property broker performs similar functions to link a handler portlet to an emitter portlet.

When the user wishes to link an emitter portlet to a handler portlet, the user sends an emitter navigation request to the property broker, which is a request to display a particular page with emitter portlets on the display. The property broker receives the request, and identifies respective emitter portlets. Once identified, the property broker displays emitter icons in the identified emitter portlets' title bars. The user views the emitter icons on the display, and selects one of the emitter icons.

The property broker identifies the emitter portlet that corresponds to the selected emitter icon, and determines whether the emitter portlet is able to emit more than one property type. If so, the property broker provides an emitter menu for the user to select one of the property types. Once selected, the property broker identifies handler portlets that are adapted to process the selected emitter portlet's property type. In turn, the property broker displays handler icons on navigation elements corresponding to pages that include a compatible handler portlet. A navigation element is an element that allows a user to select a page, such as a tab, a displayed list, a drop down list, or a navigational tree.

The user selects one of the handler icons, and the property broker determines whether the corresponding page includes multiple handler portlets that are compatible with the emitter portlet's property type. If so, the property broker displays a handler menu for the user to select one of the handler portlets via a secondary handler selection. The property broker receives the secondary handler selection, and links the emitter portlet to the selected handler portlet. In addition, the property broker displays the page that includes the linked handler portlet for the user's viewing. In cases when an emitter is wired to a specific handler, the wired handler is identified when a user selects the emitter's icon.

In a complementary scenario, when the user wishes to link a handler portlet to an emitter portlet, the user sends a handler navigation request to the property broker, which is a request to display a particular page with handler portlets on the display. In turn, the property broker performs similar functions as described above to aid the user in identifying compatible emitter portlets in which to link the handler portlet.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
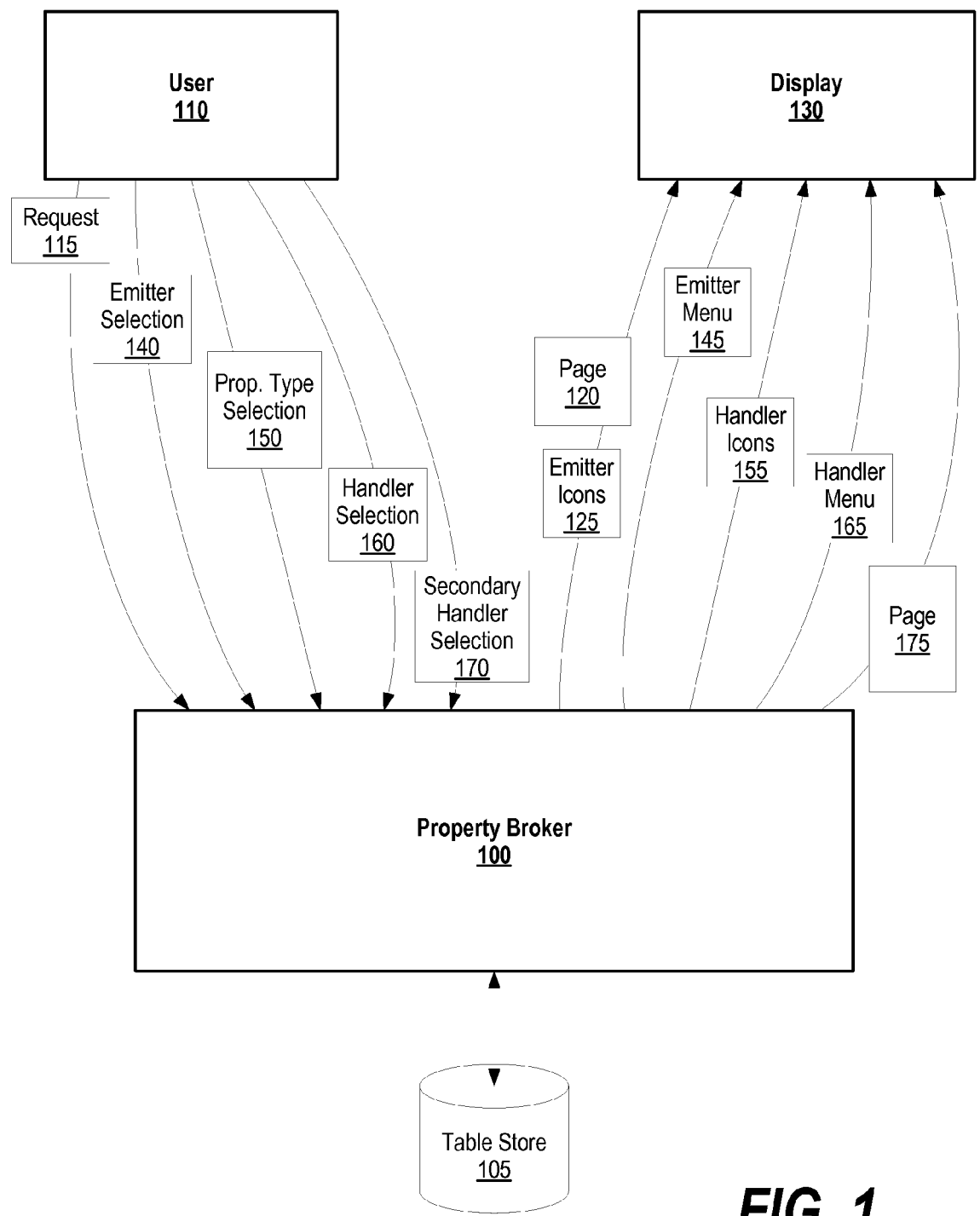
FIG. 1 is a diagram showing a property broker linking an emitter portlet located on a viewable page to a handler portlet located on a different page.

FIG. 1 is a diagram showing a property broker linking an emitter portlet located on a viewable page to a handler portlet located on a different page. User 110 sends emitter navigation request 115 to property broker 100, which is a request to display a particular page with emitter portlets on display 130. Property broker 100 receives request 115, and identifies respective emitter portlets.

Figure 6A:
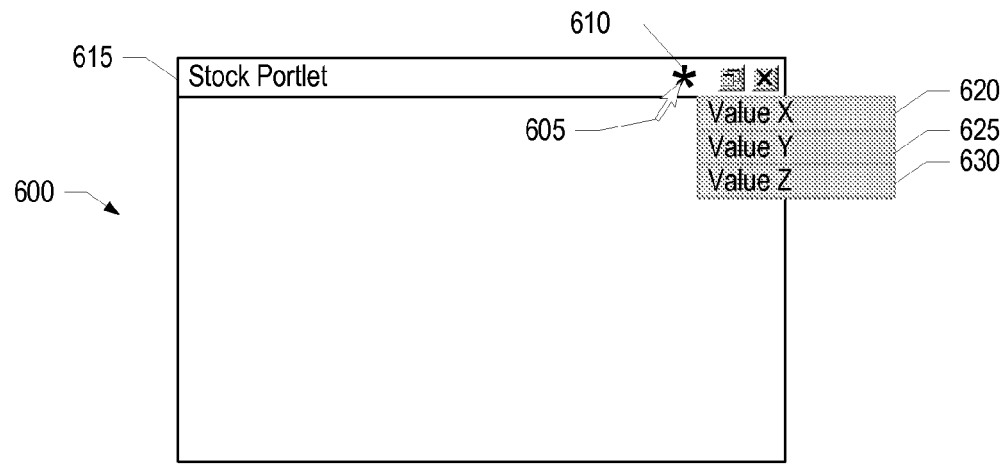
FIG. 6A shows a user selecting an emitter icon displayed on an emitter portlet's title bar.

Once identified, property broker 100 displays page 120, which includes emitter portlets, along with emitter icons 125 in the emitter portlets' title bars, such as emitter icon 610 shown in FIG. 6A. In one embodiment, a module exists between property broker 100 and display 130 to prepare and format property broker 100's output for proper viewing.

User 110 views emitter icons 125 on display 130, and selects one of the emitter icons 120 via emitter selection 140. Property broker 100 identifies the emitter portlet corresponding to emitter selection 140, and determines whether the emitter portlet is able to emit more than one property type. For example, an emitter portlet may display a list of employees, their department name, and manager. In this example, each of these fields may be enabled to emit its own property type (e.g., employee name, department name, and manager name, respectively). When the emitter portlet is able to emit more than one property type, property broker 100 provides emitter menu 145 to display 130, which includes a selection of property types. User 110 views emitter menu 145 and selects one of the property types via property type selection 150.

Figure 3:
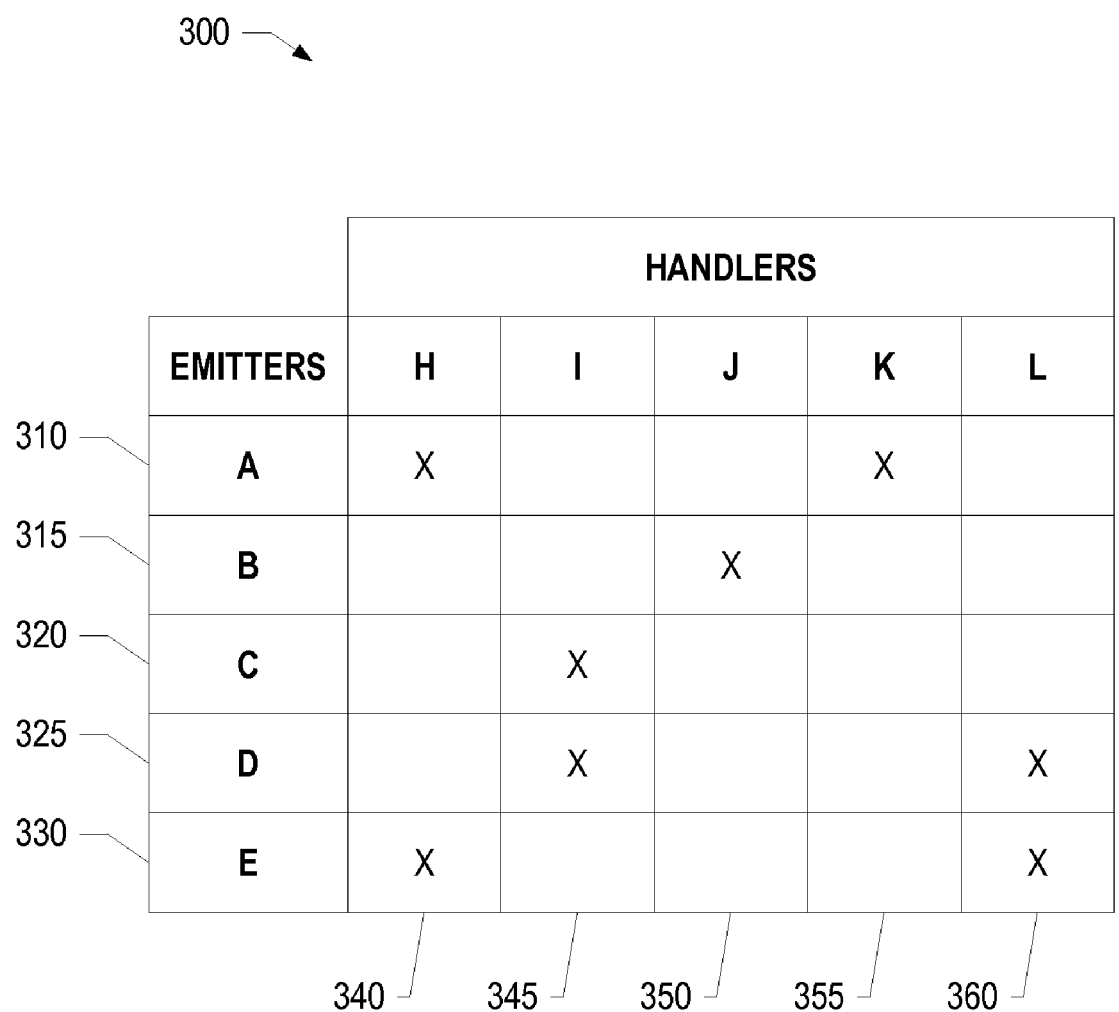
FIG. 3 is a table showing compatibility between emitter portlets and handler portlets.

Property broker 100 receives property type selection 150, and uses a table located in table store 105 to identify handler portlets that are adapted to process the selected emitter portlet's property type (see FIG. 3 and corresponding text for further details). Once property broker 100 identifies the compatible handler portlets, property broker 100 provides handler icons 155 to display 130, which are displayed on navigation elements corresponding to pages that include the compatible handler portlets. For example, if user 110 selected an emitter portlet on page "2," and compatible handler portlets are located on pages "6" and "9," then handler icons 155 are displayed on navigation elements that correspond to pages 6 and 9 (see FIG. 6B and corresponding text for further details).

User 110 views handler icons 155, and selects one of the handler icons via handler selection 160. Property broker 100 receives handler selection 160, and determines whether the corresponding page includes multiple handler portlets that are capable of processing the emitter portlet's property type. If so, property broker 100 provides handler menu 165 to display 130, which displays a list of compatible handler portlets included in the selected navigation element.

User 110 views handler menu 165, and selects one of the handler portlets via secondary handler selection 170. Property broker 100 receives secondary handler selection 170, and links the emitter portlet to the selected handler portlet. In addition, property broker 100 provides page 175, which includes the linked handler portlet, to display 130 for user 110's viewing.

Figure 2:
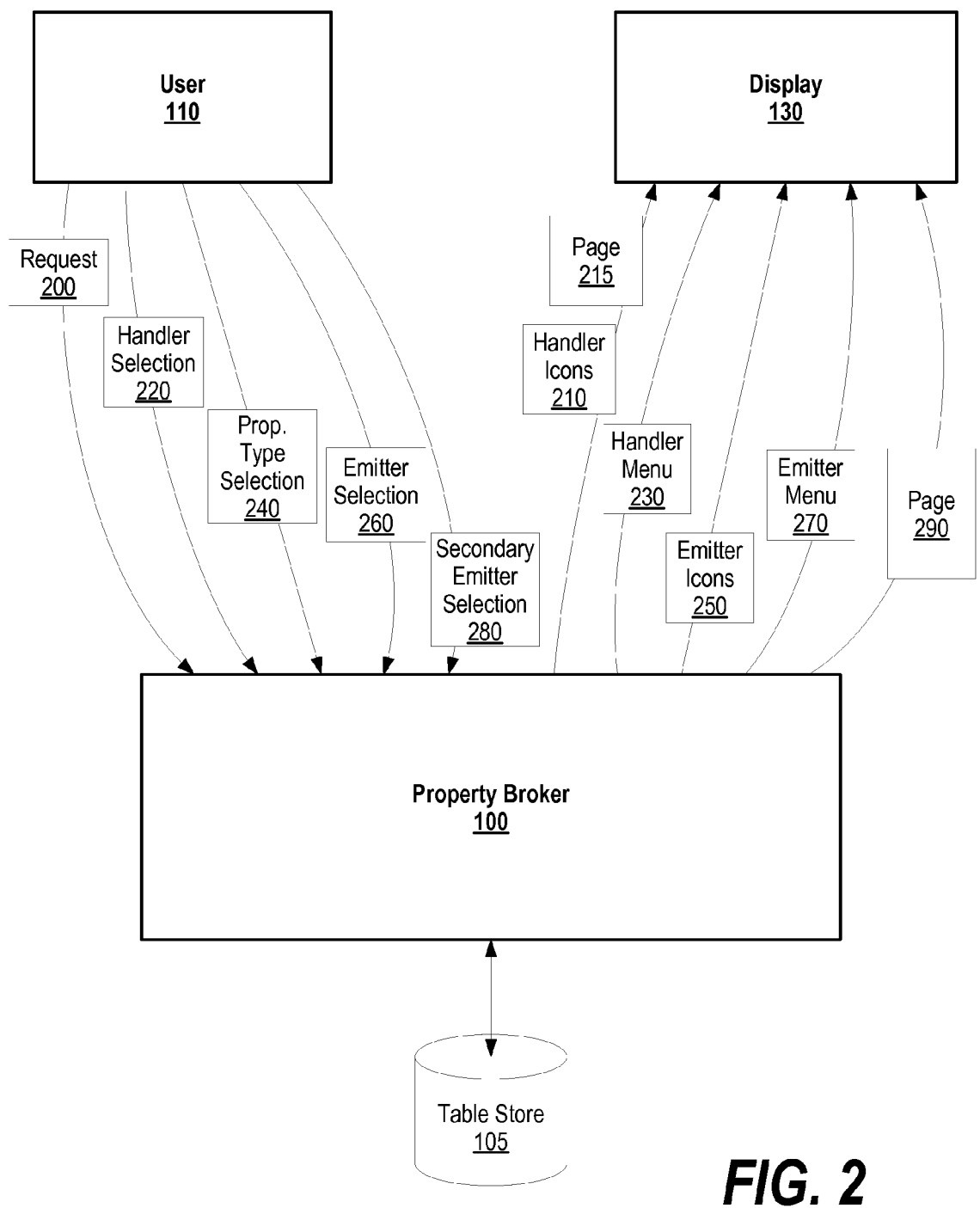
FIG. 2 is a diagram showing a property broker linking a handler portlet located on a viewable page to an emitter portlet located on a different page.

FIG. 2 is a diagram showing a property broker linking a handler portlet located on a viewable page to an emitter portlet located on a different page. FIG. 2 is similar to FIG. 1 with the exception that in FIG. 2, a handler portlet is linked to an emitter portlet, whereas in FIG. 1, an emitter portlet is linked to a handler portlet. User 110 sends handler navigation request 200 to property broker 100, which is a request to display a particular page, and identify handler portlets on the page. Property broker 100, user 110, and display 130 are the same as that shown in FIG. 1.

Figure 7A:
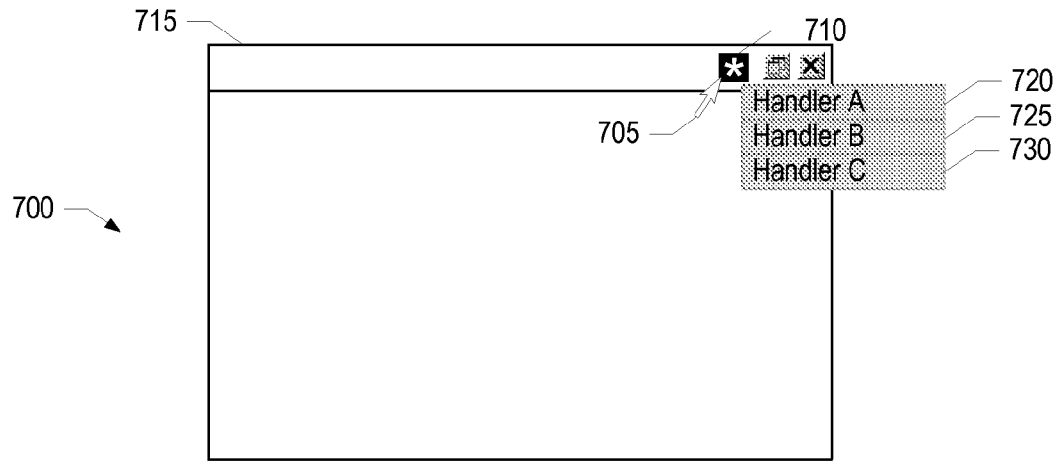
FIG. 7A shows a user selecting a handler icon displayed on a handler portlet's title bar.

Once identified, property broker 100 displays page 215, which includes handler portlets, along with handler icons 210 in the handler portlets' title bars, such as handler icon 710 shown in FIG. 7A.

User 110 views handler icons 210 on display 130, and selects one of the handler icons 210 via handler selection 220. Property broker 100 identifies the handler portlet corresponding to handler selection 220, and determines whether the handler portlet is able to process more than one property type. For example, a handler portlet may register to handle two property types such as "state name" and "zip code." In this example, when either of these values is provided to the handler portlet, the handler portlet determines which property type has been provided and responds accordingly, such as by showing a map of an entire state, or by showing a more detailed map representing a single zip code area of a state. When the handler portlet is able to process more than one property type, property broker 100 provides handler menu 230 to display 130, which includes a selection of property types. User 110 views handler menu 230 and selects one of the property types via property type selection 240.

Property broker 100 receives property type selection 240, and uses a table located in table store 105 to identify emitter portlets that emit the selected handler portlet's property type (see FIG. 3 and corresponding text for further details). Once property broker 100 identifies the compatible emitter portlets, property broker 100 provides emitter icons 250 to display 130, which are displayed on navigation elements corresponding to pages that include the compatible emitter portlets (see FIG. 7B and corresponding text for further details).

User 110 views emitter icons 250, and selects one of the emitter icons via emitter selection 260. Property broker 100 receives emitter selection 260, and determines whether the corresponding page includes multiple emitter portlets that emit the handler portlet's property type. If so, property broker 100 provides emitter menu 270 to display 130, which displays a list of compatible emitter portlets included on the selected navigation element's page.

User 110 views emitter menu 270, and selects one of the emitter portlets via secondary emitter selection 280. Property broker 100 receives secondary emitter selection 280, and links the handler portlet to the selected emitter portlet. In addition, property broker 100 provides page 290, which includes the linked emitter portlet, to display 130 for user 110's viewing.

FIG. 3 is a table showing compatibility between emitter portlets and handler portlets. A property broker uses table 300 to identify handler portlets that are compatible with selected emitter portlets, and visa versa.

Table 300 includes rows 310 through 330, and columns 340 through 360. Each of rows 310 through 330 includes compatibility information for particular emitter portlets. Likewise, columns 340 through 360 include compatibility information for particular handler portlets. For example, row 325 shows that emitter portlet D is compatible with handler portlets I and L. So, when a user selects emitter portlet D, the property broker identifies pages that include handler portlets I and L, and displays a handler icon on navigation elements that correspond to the pages.

In one embodiment, an emitter portlet may emit more than one property type (data), where each property type is handled by a different handler portlet. In this embodiment, emitter A (row 310) may emit a single property type that may be handled by both handler portlets H & K, or emitter portlet A may emit two property types, in which one property type is handled by handler portlet H, and the other property type is handled by handler portlet K.

In another embodiment, a single handler portlet may handle more than one property type. For example, handler portlet H may handle property types emitted by emitter portlets A and E in one of two scenarios. The first scenario is for handler portlet H to handle a single property type, which is emitted by both emitter portlets A and E. The second scenario is that handler portlet H handles two property types, in which emitter portlet A emits one property type and emitter portlet E emits another property type.

Figure 4:
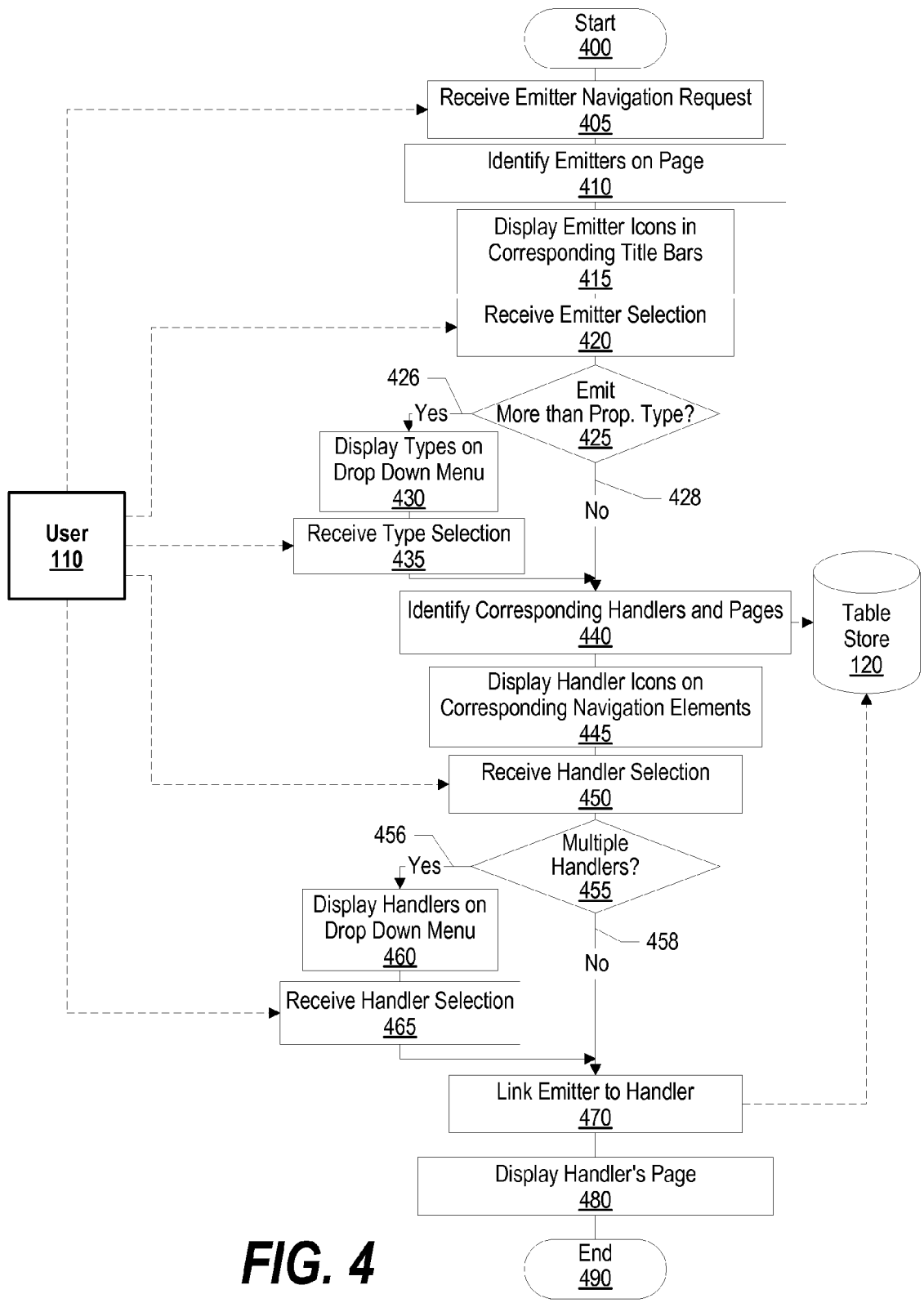
FIG. 4 is a flowchart showing steps taken in linking an emitter portlet located on a viewable page to a handler portlet located on a different page.

FIG. 4 is a flowchart showing steps taken in linking an emitter portlet located on a viewable page to a handler portlet located on a different page. Processing commences at 400, whereupon processing receives an emitter navigation request from user 110 at step 405. The emitter navigation request corresponds to a viewable page that includes emitter portlets, such as page 635 shown in FIG. 6B.

At step 410, processing identifies emitter portlets on the viewable page and, at step 415, processing displays emitter icons corresponding to the emitter portlets on their respective title bars, such as emitter icon 610 displayed on title bar 615 shown in FIG. 6A. User 110 views the displayed emitter icons, and selects one of the emitter icons, which processing receives at step 420. User 110 is the same as that shown in FIG. 1.

A determination is made as to whether the emitter portlet that corresponds to the selected emitter icon is able to emit more than one property type (decision 425). If the emitter portlet is able to emit more than one property type, decision 425 branches to "Yes" branch 426 whereupon processing displays the property types to user 110 at step 430. User 110 selects one of the property types, which processing receives at step 435. On the other hand, if the emitter portlet does not emit multiple property types, decision 425 branches to "No" branch 428 bypassing multiple property type displaying and selection steps.

At step 440, processing identifies handler portlets, and their pages, that are adapted to process the emitter portlet's selected property type by retrieving compatibility information from a table located in table store 120 (see FIG. 3 and corresponding text for further details). Once identified, processing displays handler icons on other navigation elements corresponding to pages that include the compatible handler portlets in order to alert user 110 that compatible portlets exist on the other pages (step 445) (see FIG. 6B and corresponding text for further details). In one embodiment, handler icons may also be displayed on title bars of portlets (or, applications) that are included on the same page as the selected emitter portlet. Table store 120 is the same as that shown in FIG. 1.

User 110 views the handler icons, and selects one of the handler icons, which processing receives at step 450. A determination is made as to whether the selected handler icon's corresponding page includes multiple compatible handler portlets (decision 455). If so, decision 455 branches to "Yes" branch 456 whereupon processing displays each of the compatible handler portlets to user 110 (step 460). The user selects one of the handler portlets, which processing receives as a "secondary handler selection" at step 465. On the other hand, if the selected handler icon's corresponding page does not include multiple handler portlets, decision 455 branches to "No " branch 458 bypassing multiple handler portlet selection steps.

At step 470, processing links the emitter portlet, which may be from the selection at step 420 or the selection at step 435, to the handler portlet, which may be from the selection at step 450 or the selection at step 465. Once linked, processing displays the page that includes the linked handler portlet (step 480), and processing ends at 490.

Figure 5:
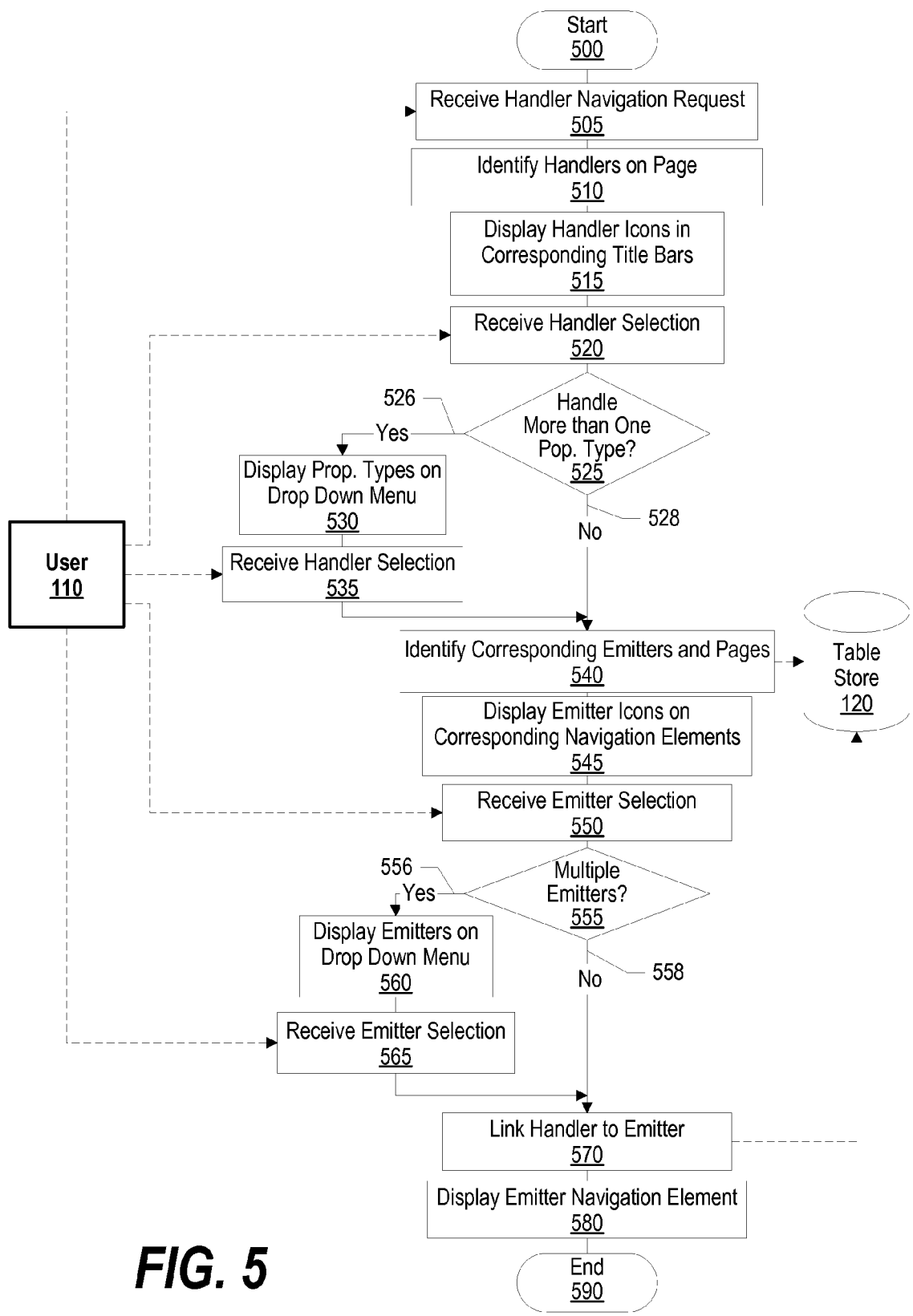
FIG. 5 is a flowchart showing steps taken in linking a handler portlet located on a viewable page to an emitter portlet located on a different page.

FIG. 5 is a flowchart showing steps taken in linking a handler portlet located on a viewable page to an emitter portlet located on a different page. FIG. 5 is similar to FIG. 4 with the exception that in FIG. 5, a handler portlet is linked to an emitter portlet, whereas in FIG. 4, an emitter portlet is linked to a handler portlet.

Processing commences at 500, whereupon processing receives a handler navigation request from user 110 at step 505. The handler navigation request corresponds to a viewable page that includes handler portlets, such as page 735 shown in FIG. 7B.

At step 510, processing identifies handler portlets on the viewable page and, at step 515, processing displays handler icons corresponding to the handler portlets on their respective title bars, such as handler icon 710 displayed on title bar 715 shown in FIG. 7. User 110 views the displayed handler icons, and selects one of the handler icons, which processing receives at step 520. User 110 is the same as that shown in FIG. 1.

A determination is made as to whether the handler portlet that corresponds to the selected handler icon is able to process more than one property type (decision 525). If the handler portlet is able to process more than one property type, decision 525 branches to "Yes" branch 526 whereupon processing displays the property types to user 110 at step 530. User 110 selects one of the property types, which processing receives at step 535. On the other hand, if the handler portlet does not process multiple property types, decision 525 branches to "No" branch 528 bypassing multiple property type displaying and selection steps.

At step 540, processing identifies emitter portlets that are compatible with the handler portlet's selected property type by retrieving compatibility information from a table located in table store 120 (see FIG. 3 and corresponding text for further details). Once identified, processing displays emitter icons on other navigation elements corresponding to pages that include the compatible emitter portlets in order to alert user 110 that compatible portlets exist on the other pages (step 545) (see FIG. 7B and corresponding text for further details). In one embodiment, emitter icons may also be displayed on title bars of portlets (or, applications) that are included on the page as the selected handler portlet.

User 110 views the emitter icons, and selects one of the emitter icons, which processing receives at step 550. A determination is made as to whether the selected emitter icon's corresponding page includes multiple compatible emitter portlets (decision 555). If so, decision 555 branches to "Yes" branch 556 whereupon processing displays each of the compatible emitter portlets to user 110 (step 560). The user selects one of the emitter portlets, which processing receives as a "secondary emitter selection" at step 565. On the other hand, if the selected emitter icon's corresponding page does not include multiple emitter portlets, decision 555 branches to "No" branch 558 bypassing multiple emitter portlet selection steps.

At step 570, processing links the handler portlet, which may be from the selection at step 520 or the selection at step 535, to the emitter portlet, which may be from the selection at step 550 or the selection at step 565. Once linked, processing displays the page that includes the linked emitter portlet (step 580), and processing ends at 590.

FIG. 6A shows a user selecting an emitter icon displayed on an emitter portlet's title bar. When a user sends an emitter navigation request to a property broker, the property broker identifies emitter portlets and displays emitter icons on their respective title bars for a user to easily identify those portlets that are emitter portlets. FIG. 6A shows that emitter portlet 600 includes emitter icon 610 on title bar 615.

A user uses pointer 605 to select emitter icon 610. When emitter portlet 600 is capable of outputting multiple property types, the property broker displays the different property types on a drop down menu for the user to select a particular property type, such as property types 620 through 630. Once the user selects a particular property type, the property broker identifies compatible handler portlets and displays handler icons on navigation elements whose corresponding pages include the compatible handler portlets (see FIG. 6B and corresponding text for further details).

Figure 6B:
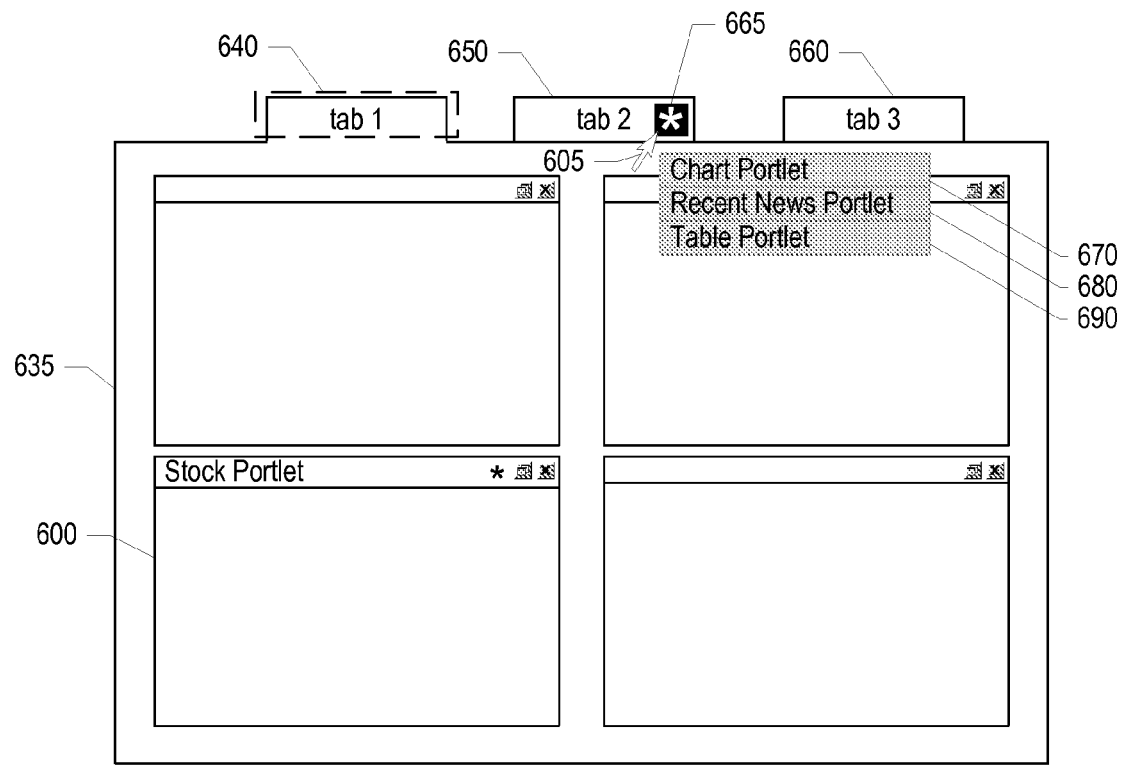
FIG. 6B shows a user selecting a handler icon for linking an emitter portlet to a corresponding handler portlet.

FIG. 6B shows a user selecting a handler icon for linking an emitter portlet to a corresponding handler portlet. FIG. 6B includes navigation elements 640, 650, and 660. Navigation element 640 corresponds to viewable page 635, which includes emitter portlet 600 (selected in FIG. 6A). A property broker identifies handler portlets that are compatible with emitter portlet 600, and displays handler icons on navigation elements whose corresponding pages include the compatible handler portlets, such as handler icon 665 displayed on navigation element 650.

The user uses pointer 605 to select handler icon 665. When multiple, compatible, handler portlets are included in navigation element 650's page, the property broker lists the handler portlets in a drop down menu for the user to select, such as handler portlets 670-690. The user then selects one of handler portlets 670-690. As a result, the property broker links emitter portlet 600 to one of handler portlets 670-690. In turn, the property broker displays navigation element 650's corresponding page in order for the user to view the selected handler portlet's navigation element (page).

FIG. 7A shows a user selecting a handler icon displayed on a handler portlet's title bar. When a user sends a handler navigation request to a property broker, the property broker identifies handler portlets and displays handler icons on their respective title bars for a user to easily identify those portlets that are handler portlets. FIG. 7A shows that handler portlet 700 includes handler icon 710 on title bar 715.

A user uses pointer 705 to select handler icon 710. When handler portlet 700 is capable of processing multiple property types, the property broker displays the different property types on a drop down menu for the user to select a particular property type, such as property types 720 through 730. Once the user selects a particular property type, the property broker identifies compatible emitter portlets and displays emitter icons on navigation elements whose corresponding pages include the compatible emitter portlets (see FIG. 7B and corresponding text for further details).

Figure 7B:
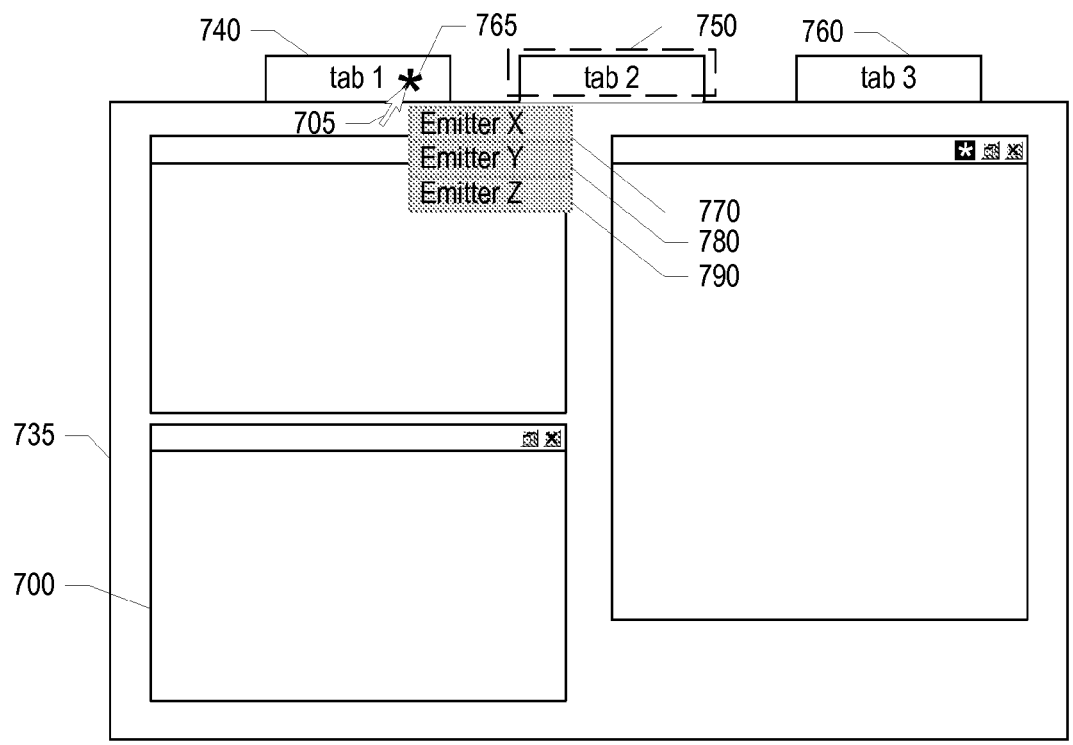
FIG. 7B shows a user selecting an emitter icon for linking a handler portlet to a corresponding emitter portlet.

FIG. 7B shows a user selecting an emitter icon for linking a handler portlet to a corresponding emitter portlet. FIG. 7B includes navigation elements 740, 750, and 760. Navigation element 740 corresponds to viewable page 735, which includes handler portlet 700 (selected in FIG. 7A). A property broker identifies emitter portlets that are compatible with handler portlet 700, and displays emitter icons on navigation elements whose corresponding pages include the compatible emitter portlets, such as emitter icon 765 displayed on navigation element 740.

The user uses pointer 705 to select emitter icon 765. When multiple, compatible, emitter portlets are included in navigation element 740's page, the property broker lists the emitter portlets in a drop down menu for the user to select, such as emitter portlets 770-790. The user then selects one of emitter portlets 770-790. As a result, the property broker links handler portlet 700 to one of emitter portlets 770-790. In turn, the property broker displays navigation element 740's corresponding page in order for the user to view the selected emitter portlet's navigation element (page).

Figure 8:
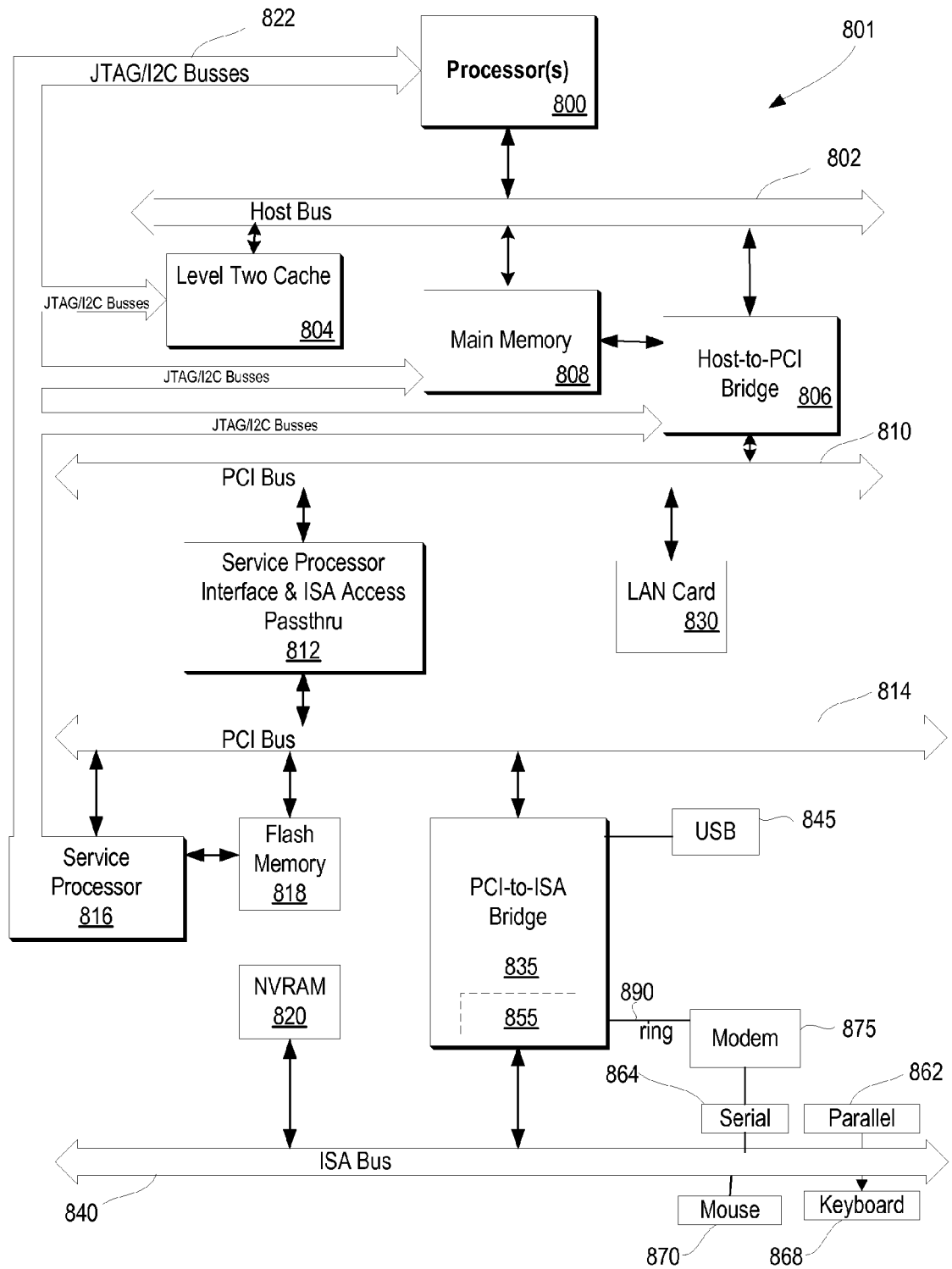
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving an emitter navigation request from a user, the emitter navigation request corresponding to a first page;
   identifying an emitter portlet on the first page in response to receiving the emitter navigation request;
   displaying a first navigation element, the first page, and a second navigation element on a user interface window, the first navigation element corresponding to the emitter portlet and the second navigation element corresponding to a second page that is not displayed;
   displaying the emitter portlet on the first page in the user interface window and displaying an emitter icon in a title bar of the emitter portlet, the emitter icon associating the emitter portlet to the emitter navigation request;
   receiving an emitter selection from the user that corresponds to the emitter portlet located on the first page;
   determining that the emitter portlet emits a plurality of property types;
   in response to determining that the emitter portlet emits the plurality of property types, displaying each of the plurality of property types on the user interface window;
   receiving a property type selection from the user that selects one of the plurality of property types;
   in response to receiving the property type selection, identifying a handler portlet located on the second page that is adapted to process the property type;
   displaying a handler icon on the second navigation element that corresponds to the identified handler portlet;
   receiving a handler selection from the user in response to displaying the handler icon;
   in response to receiving the handler selection, determining that a plurality of handler portlets, which are included in the second page, are each adapted to process the property value;
   displaying each of the plurality of handler portlets on the user interface window in response to determining that the plurality of handler portlets are each adapted to process the property value;
   receiving a secondary handler selection from the user that selects one of the displayed plurality of handler portlets;
   linking the emitter portlet to the selected handler portlet in response to receiving the secondary handler selection; and
   displaying the second page in response to linking the emitter portlet to the selected handler portlet.

2. A computer program product stored on a computer operable media, the computer operable media containing instructions for execution by a computer, which, when executed by the computer, cause the computer to implement a method for portlet compatibility indication, the method comprising:
   receiving an emitter navigation request from a user, the emitter navigation request corresponding to a first page;
   identifying an emitter portlet on the first page in response to receiving the emitter navigation request;
   displaying a first navigation element, the first page, and a second navigation element on a user interface window, the first navigation element corresponding to the emitter portlet and the second navigation element corresponding to a second page that is not displayed;
   displaying the emitter portlet on the first page in the user interface window and displaying an emitter icon in a title bar of the emitter portlet, the emitter icon associating the emitter portlet to the emitter navigation request;
   receiving an emitter selection from the user that corresponds to the emitter portlet located on the first page;
   determining that the emitter portlet emits a plurality of property types;
   in response to determining that the emitter portlet emits the plurality of property types, displaying each of the plurality of property types on the user interface window;
   receiving a property type selection from the user that selects one of the plurality of property types;
   in response to receiving the property type selection, identifying a handler portlet located on the second page that is adapted to process the property type;
   displaying a handler icon on the second navigation element that corresponds to the identified handler portlet;
   receiving a handler selection from the user in response to displaying the handler icon;

in response to receiving the handler selection, determining that a plurality of handler portlets, which are included in the second page, are each adapted to process the property value;

displaying each of the plurality of handler portlets on the user interface window in response to determining that the plurality of handler portlets are each adapted to process the property value;

receiving a secondary handler selection from the user that selects one of the displayed plurality of handler portlets;

linking the emitter portlet to the selected handler portlet in response to receiving the secondary handler selection; and displaying the second page in response to linking the emitter portlet to the selected handler portlet.

3. An information handling system comprising:

one or more processors;

a memory accessible by the processors;

a display;

one or more nonvolatile storage devices accessible by the processors; and an indication tool for providing indicators of portlet compatibility, the indication tool executed by the processors to perform steps comprising:

receiving an emitter navigation request from a user, the emitter navigation request corresponding to a first page;

identifying an emitter portlet on the first page in response to receiving the emitter navigation request;

displaying a first navigation element, the first page, and a second navigation element on a user interface window, the first navigation element corresponding to the emitter portlet and the second navigation element corresponding to a second page that is not displayed;

displaying the emitter portlet on the first page in the user interface window and displaying an emitter icon in a title bar of the emitter portlet, the emitter icon associating the emitter portlet to the emitter navigation request;

receiving an emitter selection from the user that corresponds to the emitter portlet located on the first page;

determining that the emitter portlet emits a plurality of property types;

in response to determining that the emitter portlet emits the plurality of property types, displaying each of the plurality of property types on the user interface window;

receiving a property type selection from the user that selects one of the plurality of property types;

in response to receiving the property type selection, identifying a handler portlet located on the second page that is adapted to process the property type;

displaying a handler icon on the second navigation element that corresponds to the identified handler portlet;

receiving a handler selection from the user in response to displaying the handler icon;

in response to receiving the handler selection, determining that a plurality of handler portlets, which are included in the second page, are each adapted to process the property value;

displaying each of the plurality of handler portlets on the user interface window in response to determining that the plurality of handler portlets are each adapted to process the property value;

receiving a secondary handler selection from the user that selects one of the displayed plurality of handler portlets;

linking the emitter portlet to the selected handler portlet in response to receiving the secondary handler selection; and displaying the second page in response to linking the emitter portlet to the selected handler portlet.

* * * * *